June 7, 1955  P. M. HOLLINGSWORTH  2,710,273
ELECTRIC CABLES
Original Filed Dec. 23, 1947
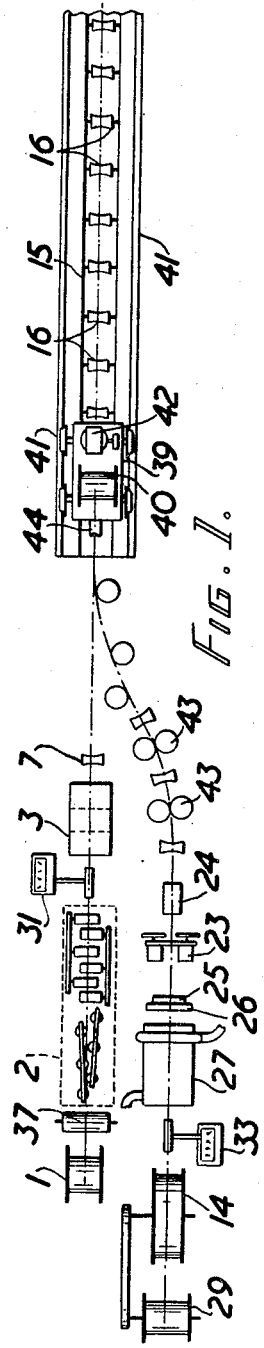
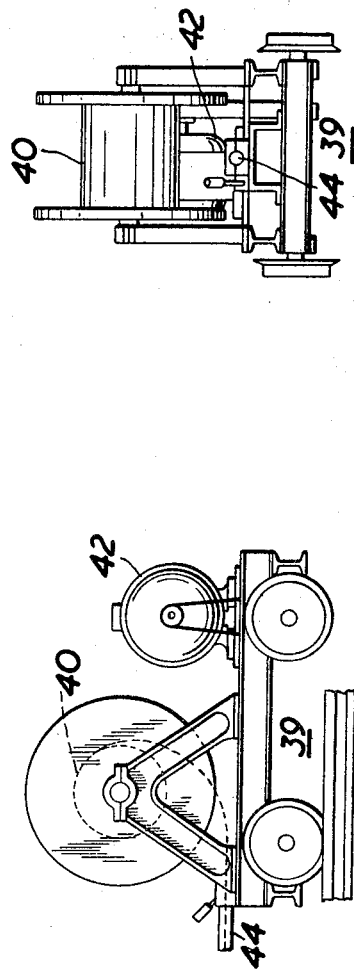
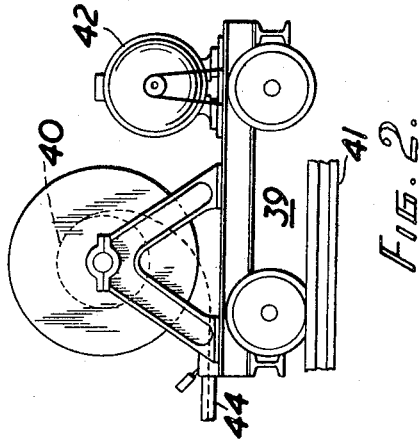
Inventor
P. M. Hollingsworth
By John A. Seifert
Attorney

United States Patent Office 2,710,273
Patented June 7, 1955

2,710,273
ELECTRIC CABLES

Philip M. Hollingsworth, Sidcup, England, assignor to Johnson and Phillips Limited, London, England, a British company Original application December 23, 1947, Serial No. 793,508, now Patent No. 2,664,372, dated December 29, 1953. Divided and this application January 14, 1950, Serial No. 138,643

Claims priority, application Great Britain May 29, 1947

3 Claims. (Cl. 154—2.26)

The invention relates to the construction of electric cables, the conductor or conductors of which may be insulated with any appropriate material as, for example, rubber, varnished cotton cloth or oil impregnated paper. The present application is a division of my Patent No. 2,664,372 issued December 29, 1953.

Such cables are frequently, and in the case of the last named type of insulation, almost invariably, provided with a continuous metallic sheathing the functions of which are to seal the insulating material from contact with moisture, to afford mechanical protection and to confine the electrical potential.

For this purpose, the use of lead and lead alloys is and has been common practice owing to the unique physical nature of these metals which enables them to be readily and directly applied to the aforementioned types of cable by the extrusion process.

The benefit of easy extrusion has been a major factor in outweighing certain disadvantageous characteristics of lead and its alloys, principally their relatively poor mechanical strength and their high specific gravity.

The present invention has for its objects provision of an improved method by which a sheathing of a metal such as, for example, the so-called commercially pure aluminium (aluminium content above 99.0%), the so-called super-purity-aluminium (99.99%), zinc, copper or alloys of such metals, which possess greatly superior mechanical strength to that of lead or lead alloys, may be applied to an insulated cable core.

Such metals, by virtue of their greater hardness and high melting points, cannot easily be directly extruded on to a cable core, partly owing to the very high pressures required, which involve special and expensive types of extrusion machines, and partly because of the elevated extrusion temperatures required, which are highly detrimental to most insulating materials.

The invention consists broadly in a method of providing metallic sheathing on electric cable core, according to which the cable core is first threaded into a previously formed tube of the required metal of a diameter larger than the required diameter of the finished sheathing and said tube is subsequently reduced or sunk to the required diameter, the threading of said core into said tube being effected by attaching the end of said core to an inner element inserted inside the end of said tube, and effecting relative longitudinal movement between said tube and a complementary outer element outside said tube, which outer elements operates to retain said inner element against longitudinal movement relative to itself, whereby said inner element, and therefore said core, are progressively drawn into said tube.

Preferably we employ seamless tubing formed, for example, in aluminium or like metal by any suitable means such as extrusion, drawing or by a combination of such processes. The operation may also include annealing or other measures necessary to secure desired physical properties in the finished sheathing.

As above stated the tubing is so formed as to have its internal diameter greater by a certain amount than the overall diameter of the insulated cable core; also each length of tube is correspondingly shorter than the corresponding length of the insulated cable core, so that the total volume of the tube length is precisely equal to that required for the finished length of sheathing of the designed thickness and internal diameter.

The minimum amount of clearance to be allowed to permit satisfactory insertion of the cable core varies somewhat with the size of cable, but in general lies between 5% and 15% of the internal diameter of the tube. The maximum amount of clearance is governed by the degree of final reduction from the tube to the finished sheath which is found to be expedient and this will depend upon the characteristics of the metal used for sheathing. In practice it is found that one diameter of tube will cover a wide range of core sizes; in 99.6% aluminium, for example, reductions in diameter of the order of 50% are practicable.

In order that the invention may be the more clearly understood, a process in accordance therewith will now be described, reference being made to the accompanying drawings wherein:

Figure 1 is a schematic plan of the layout involved in said process,

Figure 2 is a side elevation, and

Figure 3 is an end elevation of a device comprised in said layout of Figure 1.

Referring to the drawings the tube T, in like manner as described in my Patent No. 2,664,372, is wound off a drum 1, through a straightening machine 2, through a magnetic threading device 3, over a guide roller 7, and on to a laying out trough 15 with rollers 16. Instead, however, of the tube being drawn on to the trough 15 by means of a draw drum as in the said patent, and a core tow line being simultaneously threaded into said tube, said tube is drawn on to said trough by means of a towing carriage 39 and simultaneously the core C whose end is attached direct to an armature device such as the armature device 8 or 8a of said patent is paid off a drum 40 mounted on said towing carriage and progressively enters the tube under the action of said device 3 (which may be the same as in said patent) as said tube is pulled along by said carriage. In this way both the tow lines L1 and L2 of said patent are dispensed with. Said carriage runs on rails 41 on each side of said trough 15 and has a driving motor 42.

Assuming the tube is wound on the drum 1 in a continuous length equal to some multiple of the maximum length of travel of the carriage, when the required length of tube has been laid out the tube is severed at a point coinciding with the position of the junction between the armature device 8 or 8a of said patent and the core C and said core is detached from said armature device, the armature being left in the rear portion of the tube held by the continuously energised device 3 in readiness for the next operation. The position at which the junction between armature and core is made, and severance of the tube takes place, is so selected as to facilitate the attachment of the forward end of the rear portion of the tube to the carriage after the carriage has been drawn back into the starting position.

The rear end of the front tube portion which has the core in it is now directed or guided, by suitable means indicated at 43, rearwardly towards the sinking die 25 which is situated on a line parallel to and conveniently beside that along which the straightening has taken place.

This end of the tube is first suitably prepared, as described in connection with said patent, by means of a swaging machine 23, while held by a fixed clamp 24, and is then inserted into the die 25 through which it is drawn by means of a draw drum 14 equivalent to that of said patent. For this operation the end of the tube will of course be connected to a suitable rope or line and the latter will be first wound on to the draw drum, after which the tube (now sunk on to the core to form the finished cable) will be wound direct on to said draw drum. The cable led by the said rope or line, subsequently passes on to the cable reeling drum 29. As in the process described in said patent the cable, between the sinking die 25 and the draw drum 14, passes through a degreasing bath 27, and a length indicator 33 is also provided.

During this operation the tube remains attached to the carriage 39 and thereby draws the latter back to its starting position close to the device 3. The tube is then detached from said carriage 39 and the core cut, leaving a short piece of said core protruding from said tube to allow for the small increase in length of the short portion of the tube remaining between the carriage and the sinking die.

The end of the core on the carriage 39 is then connected to the armature device (which is already in the forward end of the second portion of the tube) and the said forward end of said second tube portion is connected to the carriage, and the whole process is repeated until another length of cable is produced.

The amount of core initially on the drum 40 of the carriage can be sufficient to produce a plurality of lengths of finished cable. The length required for each successive length of cable will not be fully unwound from the drum during the operation of laying out and straightening the tube, owing to the fact that the length of the tube extends during the sinking process. Thus, when the tube is being drawn in the reverse direction through the sinking die 25, its increasing length will cause the drum of core 40 on the carriage to continue to unwind slowly and additional core to enter the tube.

More particularly, the carriage 39 has a tubular extension 44, which is adapted to be connected coaxially to the end of the tube and through which the core, from the drum 40 passes into the interior of the tube. In initiating the operation on the first length of tube, the end of the tube having been passed through the straightening device 2 and the threading device 3 the armature device 8 or 8a of said patent is inserted into the tube in the appropriate position with respect to the device 3, and the latter is then energised.

The carriage is brought close to the threading device 3 and the core is then passed from the drum 40 through the tubular extension 44 to the outside, where it is coupled to the armature device, which is within the end of the tube but sufficiently accessible for the coupling to be effected, and said tube is then connected to the tubular extension 44. The carriage then operates to lay the tube out as described. In the case of subsequent lengths of tube the procedure is the same except that the armature device 8 or 8a of said patent is already within the tube.

The pulling, through the sinking die 25 of each length of tube subsequent to the first can be effected by means of the preceding length in the manner indicated in Figure 14 of said patent. Each length can also be used to draw the succeeding length up to the sinking die.

The parts designated by the references 26, 31 and 37 are the same as the similarly designated parts described in said patent.

It is to be understood that the process described, and particularly the apparatus employed therein, can be varied in many ways without departing from the scope of the appended claims. For example it would be possible, as an alternative to the device 3 and armature 8 or 8a of said patent for threading the core tow line into the tube, to attach said core tow line to a mandrel and to insert said mandrel into the end of the tube, said tube, when subsequently drawn forwardly being pulled through a die giving a slight reduction such as may be used for straightening the tube.

This mandrel is of too great diameter to pass with the tube through this die and it is so shaped that without jamming it will be held back by the die as the tube is pulled through the latter. The tube will thus run past the mandrel through the die, the mandrel being in fact held back by the stationary, shouldered portion of the moving tube just prior to the entry into the die.

Again, as an alternative to the capstan or draw drum 14, there may be employed a machine of well-known design which operates to grip the cable with a pair of arms which travel forwardly a short distance while the grip is held, there releasing and returning with a reciprocating motion to repeat the process.

By means of a plurality of pairs of arms operating in succession, a substantially constant forward motion of the cable is achieved.

I claim:

1. A method of inserting a cable core into a length of tube, which comprises coiling the cable core about a given axis in a manner permitting said core to be paid out by applying tension to an end thereof, attaching an end of the tube to a point which is fixed in relationship to said axis, establishing a stationary electromagnetic field outside the tube and extending to the inside of the tube, inserting the said end of the core into the said end of the tube within the electromagnetic field, retaining the said end of the core in fixed position in the tube by said electromagnetic field, and moving said axis and point in the same direction from the electromagnetic field and thereby drawing said tube from the electromagnetic field and paying out said core into said tube.

2. A method of inserting a cable core into a length of tube, which comprises coiling the cable core about a given axis in a manner permitting said core to be paid out by applying tension to an end thereof, attaching an end of the tube to a point which is fixed in relationship to and movable with said axis, inserting an inner element of magnetizable material into said end of said tube, attaching the said end of the core directly to said inner element, establishing a stationary electromagnetic field outside and extending into said tube to retain said inner element against longitudinal movement in the tube, and moving said axis and point in the same direction from the electromagnetic field to draw said tube from the electromagnetic field and pay out said core into said tube.

3. A method of inserting a cable core into a length of tube, which comprises coiling the cable core about a given axis in a manner permitting said core to be paid out by applying tension to an end thereof, attaching an end of the tube to a point which is fixed in relationship to and movable with said axis, inserting an inner element of magnetizable material into said end of said tube, directly attaching the end of said core to said inner element, establishing a stationary electromagnetic field outside and extending into the tube to attract and retain said inner element and core in fixed position in the tube, moving said axis and point in the same direction from the electromagnetic field to draw the tube from the electromagnetic field and pay out said core into said tube, and subsequently pulling said tube in the reverse direction while the tube is attached to the point whereby the axis and point are returned to their initial position for repetition of the cycle with a further length of tube after the first length of tube is detached from the point and the cable core in said first length of tube is severed from the coil of cable core.

References Cited in the file of this patent

UNITED STATES PATENTS

| | | |
|---|---|---|
| 550,705 | Williams | Dec. 3, 1895 |
| 1,227,346 | Trood et al. | May 22, 1917 |
| 1,700,454 | Schumacher | Jan. 29, 1929 |
| 2,066,201 | Jack | Dec. 29, 1936 |
| 2,377,908 | Slaughter | June 12, 1945 |
| 2,386,119 | Jack | Oct. 2, 1945 |

FOREIGN PATENTS

| | | |
|---|---|---|
| 627,793 | Great Britain | Aug. 16, 1949 |